(12) United States Patent
Liu et al.

(10) Patent No.: US 12,000,319 B2
(45) Date of Patent: Jun. 4, 2024

(54) THREE-WAY CATALYTIC CONVERTER PREHEATING CONTROL METHOD AND SYSTEM, VEHICLE AND STORAGE MEDIUM

(71) Applicants: Zhejiang Geely Holding Group Co., Ltd., Hangzhou (CN); Ningbo Geely Royal Engine Components Co., Ltd., Ningbo (CN); Aurobay Technology Co., Ltd., Ningbo (CN)

(72) Inventors: Junqi Liu, Ningbo (CN); Chen Yang, Ningbo (CN); Shubo Li, Ningbo (CN); Rongchun Ma, Ningbo (CN); Jie Chen, Ningbo (CN); Xudong Sun, Ningbo (CN); Yige Xiao, Ningbo (CN); Ruiping Wang, Ningbo (CN)

(73) Assignees: Zhejiang Geely Holding Group Co., Ltd., Hangzhou (CN); Ningbo Geely Royal Engine Components Co., Ltd., Ningbo (CN); Aurobay Technology Co., Ltd., Ningbo (CN)

(*) Notice: Subject to any disclaimer, the term of this patent is extended or adjusted under 35 U.S.C. 154(b) by 0 days.

(21) Appl. No.: 18/041,801

(22) PCT Filed: Jun. 13, 2022

(86) PCT No.: PCT/CN2022/098490
§ 371 (c)(1),
(2) Date: Feb. 16, 2023

(87) PCT Pub. No.: WO2022/262690
PCT Pub. Date: Dec. 22, 2022

(65) Prior Publication Data
US 2023/0296040 A1    Sep. 21, 2023

(30) Foreign Application Priority Data
Jun. 18, 2021 (CN) .......................... 202110680005.3

(51) Int. Cl.
*F01N 3/20* (2006.01)
*B60L 1/12* (2006.01)
(Continued)

(52) U.S. Cl.
CPC .............. *F01N 3/2013* (2013.01); *B60L 1/12* (2013.01); *B60W 20/00* (2013.01); *F01N 3/101* (2013.01);
(Continued)

(58) Field of Classification Search
CPC ........ F01N 3/027; F01N 3/0892; F01N 3/101; F01N 3/103; F01N 3/20; F01N 3/2006;
(Continued)

(56) References Cited

U.S. PATENT DOCUMENTS

2012/0072063 A1* 3/2012 Kato ..................... B60W 10/26
180/65.265
2017/0084092 A1* 3/2017 Ohsaki ................. G07C 5/0825
(Continued)

FOREIGN PATENT DOCUMENTS

CN    109424399 A    3/2019
JP    H07102968 A    4/1995

OTHER PUBLICATIONS

The Office Action of CN application No. 202110680005.3 issued on Jul. 7, 2023.
(Continued)

*Primary Examiner* — Binh Q Tran
(74) *Attorney, Agent, or Firm* — Andrew C. Cheng

(57) ABSTRACT

The invention provides a three-way catalytic converter preheating control method and system, a vehicle and a storage medium. The includes when the temperature of an exhaust pipe of the hybrid electric vehicle is lower than a first temperature threshold value, sending a first work instruction; the high-low pressure conversion module outputting a
(Continued)

first working voltage according to the first working instruction so as to start preheating of a catalyst in a three-way catalytic converter; when working data of the hybrid electric vehicle meets the switching condition, sending a second working instruction to make the high-low voltage conversion module outputs a second working voltage and stops outputting the first working voltage so as to stop the electric heating. According to the invention, two working modes can be provided, and the power battery can be used for electrically heating the catalyst in advance through the high-low pressure conversion module.

10 Claims, 2 Drawing Sheets

(51) Int. Cl.
*B60W 20/00* (2016.01)
*F01N 3/027* (2006.01)
*F01N 3/08* (2006.01)
*F01N 3/10* (2006.01)
*F01N 9/00* (2006.01)
*F01N 11/00* (2006.01)

(52) U.S. Cl.
CPC ............... *B60W 2710/0694* (2013.01); *B60W 2710/086* (2013.01); *F01N 3/027* (2013.01); *F01N 3/0892* (2013.01); *F01N 9/005* (2013.01); *F01N 9/007* (2013.01); *F01N 11/002* (2013.01); *F01N 11/005* (2013.01); *F01N 2390/02* (2013.01); *F01N 2550/22* (2013.01); *F01N 2900/1404* (2013.01)

(58) Field of Classification Search
CPC ........ F01N 3/2013; F01N 3/2026; F01N 9/00; F01N 9/005; F01N 9/007; F01N 11/002; F01N 11/005; F01N 2240/04; F01N 2240/16; F01N 2550/22; F01N 2590/11; F01N 2390/02; F01N 2900/0602; F01N 2900/08; F01N 2900/104; F01N 2900/1404; F01N 2900/1602
See application file for complete search history.

(56) References Cited

U.S. PATENT DOCUMENTS

| | | | | |
|---|---|---|---|---|
| 2017/0306821 | A1* | 10/2017 | Hashimoto | B60L 53/14 |
| 2018/0163592 | A1* | 6/2018 | Hirooka | F01N 3/20 |
| 2019/0331037 | A1* | 10/2019 | Suzuki | B60K 6/445 |
| 2020/0232373 | A1* | 7/2020 | Korenaga | F01N 3/2006 |
| 2020/0240307 | A1* | 7/2020 | Matsumura | B01D 53/94 |
| 2021/0348540 | A1* | 11/2021 | Szczepanski | F01N 3/021 |

OTHER PUBLICATIONS

The Search Report of CN application No. 202110680005.3 issued on Jul. 7, 2023.

* cited by examiner

THREE-WAY CATALYTIC CONVERTER PREHEATING CONTROL METHOD AND SYSTEM, VEHICLE AND STORAGE MEDIUM

CROSS REFERENCE TO RELATED APPLICATION

The present disclosure is the national phase entry of International Patent Application No. PCT/CN2022/098490, filed on Jun. 13, 2022, which claims priority to Chinese Patent Application No. 202110680005.3, filed on Jun. 18, 2021. All of the aforementioned patent applications are hereby incorporated by reference in their entireties.

TECHNICAL FIELD

This application relates to the technical field of energy saving and emission reduction of hybrid electric vehicles, and in particular to a three-way catalytic converter preheating control method, system, vehicle and storage medium.

BACKGROUND

In the field of energy and ecology, resource depletion and environmental degradation are serious problems that people have to face. As a major energy consumption and emission producer, energy conservation and emission reduction have become the primary task of the automotive industry. By 2025, the country will implement the National VII emission standard. The emission requirements will be more stringent, which puts forward higher requirements for automobile emission treatment technology.

In order to solve the problem that the conversion efficiency of the catalyst in the three-way catalyst is very low when the temperature of the engine exhaust pipe is lower than 300° C., people invented the EHC (Electrically Heated Catalyst) electric heating technology, that is, before the engine is started, the electric heating is used in advance. The heating method takes 1 to 2 minutes to quickly heat the catalyst to its working temperature. At present, there are two kinds of catalyst electric heaters, 12V/2 kW and 48V/4 kW EHC on the market. The 48V/4 kW electric heater is found to be effective in use and can meet the future emission requirements of National VII.

Technical Problem

There are some flaws in the prior art solution:

For the hybrid electric vehicle with 300V high voltage power battery, the 48V/4 kW electric heater must be converted from 300V to 48V DC before it can be used. At present, the DC-DC circuit on the hybrid vehicle is generally DC-DC with 12V output. If one 48V power supply is to be added, another 48V DC-DC with 48V output should be developed or 48V DC-DC should be integrated into the existing 12V DC-DC on the hybrid vehicle. However, both split-type 48V external DC-DC and internally integrated 48V DC-DC will have problems of large volume and high cost, and it is difficult to carry out industrial application.

Technology Solution

This application provides a three-way catalytic converter preheating control method, system, vehicle and storage medium, which use two working voltage modes provided by a high-low-voltage conversion module (ie, high-voltage to low-voltage DCDC), and through digital control instructions, it can use the power battery to preheat the catalyst in the three-way catalytic converter through the high-and-low-voltage-conversion module when the temperature of the exhaust pipe is low.

In one aspect, the present application provides a three-way catalytic converter preheating control method, which is applied to a hybrid vehicle. Specifically, the three-way catalytic converter preheating control method includes: when the temperature of the exhaust pipe of the hybrid vehicle is lower than a the first temperature threshold, sending a first work instruction to the high-and-low-voltage-conversion module; the high-and-low-voltage-conversion module outputting a first working voltage to turn on the electric heating of the catalyst according to the first work instruction; obtaining working data of the hybrid electric vehicle; when the working data meets the switching condition, sending a second working instruction to the high-and-low-voltage-conversion module; the high-and-low-voltage-conversion module outputting a second working voltage and stopping outputting the first working voltage according to the second working instruction to stop the electric heating.

Optionally, before the step of when the temperature of an exhaust pipe of the hybrid electric vehicle is lower than the first temperature threshold, sending the first work instruction to the high-and-low-voltage-conversion module, the three-way catalytic converter preheating control method includes: obtaining the power of a low-voltage battery; when the power of the low-voltage battery is lower than the power threshold, outputting a second working voltage to charge the low-voltage battery.

Optionally, after the step of the high-and-low-voltage-conversion module outputting a second working voltage and stopping outputting the first working voltage according to the second working instruction, the three-way catalytic converter pre-heating control method includes: starting an engine of the hybrid electric vehicle according to the second operating voltage.

Optionally, the switching condition of the three-way catalytic converter preheating control method is that the output duration of the first working voltage reaches a first-time threshold; or, the temperature of an exhaust pipe is not lower than the first temperature threshold.

On the other hand, the present application also provides a three-way catalytic converter preheating control system applied to a hybrid electric vehicle. Specifically, the three-way catalytic converter preheating control system includes a state acquisition module, a processing module, a high-and-low-voltage-conversion module, an electric heater module, and a power battery module: the state acquisition module is configured to acquire and send the temperature of an exhaust pipe of the hybrid electric vehicle and the working data of the hybrid electric vehicle to the processing module; the processing module is configured to send a first work instruction to the high-and-low-voltage-conversion module when the temperature of the exhaust pipe of the hybrid electric vehicle is lower than a first temperature threshold, the processing module may be a vehicle controller or other ECUs with the same function; and when the work data meets a switching condition, send a second work instruction to the high-and-low-voltage-conversion module; the high-and-low-voltage-conversion module outputs a first working voltage according to the first working instruction to enable the electric heater module to turn on electric heating of the catalyst, according to the second working instruction, outputs a second working voltage and stops outputting the first working voltage enables the electric heater module to stop the electric heating.

Optionally, the processing module of the three-way catalytic converter preheating control system is also configured to start the engine of the hybrid vehicle.

Optionally, the first working voltage of the three-way catalytic converter preheating control system is 48V, and the second working voltage is 12V.

Optionally, the high-and-low-voltage-conversion module of the three-way catalytic converter preheating control system includes a voltage conversion circuit, and the voltage conversion circuit is configured to convert the high-voltage-power-battery voltage into the first working voltage and the second working voltage.

Optionally, the voltage conversion circuit of the three-way catalytic converter preheating control system includes a high-and-low-voltage-conversion-switch circuit, a high frequency transformer, a 12V output circuit, a 48V output circuit, a 12V-output-and-48V-output-switching circuit.

Optionally, the switching condition of the three-way catalytic converter preheating control system is that the output duration of the first working voltage reaches a first-time threshold; or, the temperature of an exhaust pipe is not lower than a setting temperature threshold.

On the other hand, the present application also provides a vehicle. Specifically, the vehicle includes a vehicle body and the three-way catalytic converter preheating control system as described above.

On the other hand, the present application also provides a storage medium. Specifically, a computer program is stored on the storage medium. When the computer program is executed by a computer, the above-mentioned three-way catalytic converter preheating control method can be realized.

Beneficial Effect

As mentioned above, the three-way catalytic converter preheating control method, system, vehicle and storage medium provided by this application can provide two working modes through digital control instructions, and can use the power battery to preheat the catalyst in the three-way catalytic converter through the high-and-low-voltage-conversion module when the temperature of the exhaust pipe is low.

BRIEF DESCRIPTION OF THE DRAWINGS

The drawings here are incorporated into the specification and constitute a part of the specification, show embodiments that conform to the application, and are used together with the specification to explain the principle of the application. In order to more clearly illustrate the technical solutions of the embodiments of the present application, the following will briefly introduce the accompanying drawings used in the description of the embodiments. Obviously, for those of ordinary skill in the art, they will not pay any creative labor. Under the premise, other drawings can be obtained based on these drawings.

The realization, functional characteristics, and advantages of the purpose of this application will be further described in conjunction with the embodiments and with reference to the accompanying drawings. Through the above drawings, the specific embodiments of the present application have been shown, which will be described in more detail later. These drawings and text descriptions are not intended to limit the scope of the concept of the present application in any way, but to explain the concept of the present application for those skilled in the art by referring to specific embodiments.

DETAILED DESCRIPTION OF PREFERRED EMBODIMENTS

The exemplary embodiments will be described in detail here, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present application. On the contrary, they are merely examples of devices and methods consistent with some aspects of the application as detailed in the appended claims.

It should be noted that in this article, the terms "include", "comprise" or any other variants thereof are intended to cover non-exclusive inclusion, so that a process, method, article or device including a series of elements not only includes those elements, It also includes other elements that are not explicitly listed, or elements inherent to the process, method, article, or device. Without more restrictions, the element defined by the sentence "including a . . . " does not exclude the existence of other same elements in the process, method, article or device that includes the element. In addition, the application is implemented differently. The parts, features, and elements with the same name in the examples may have the same meaning or different meanings, and their specific meanings need to be determined by their interpretation in the specific embodiment or further combined with the context in the specific embodiment.

It should be understood that the specific embodiments described here are only used to explain the present application, and are not used to limit the present application.

Figure 1:
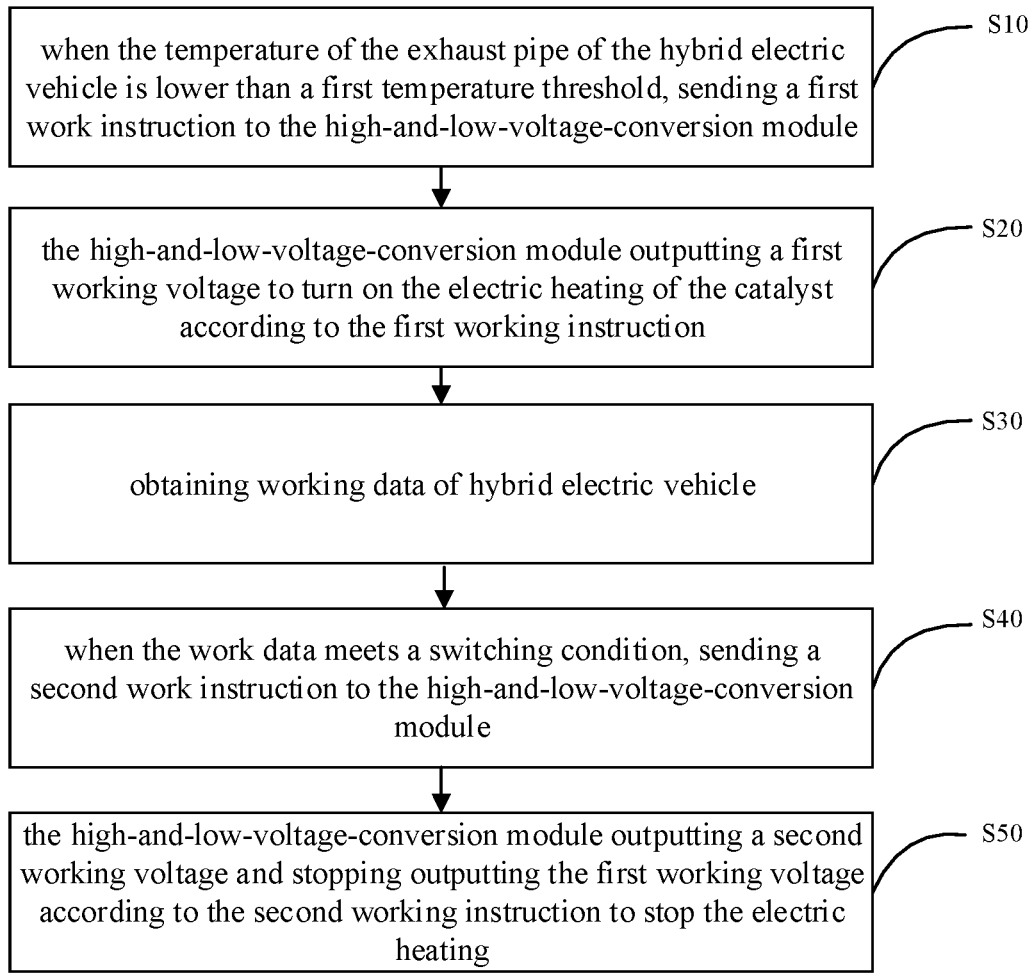
FIG. 1 is a flow chart of a three-way catalytic converter preheating control method according to an embodiment of the application.

In one aspect, the present application provides a three-way catalytic converter preheating control method. FIG. 1 is a flowchart of a three-way catalytic converter preheating control method according to an embodiment of the present application.

Referring to FIG. 1, in one embodiment, a three-way catalytic converter preheating control method applied to a hybrid electric vehicle includes:

S10: when the temperature of the exhaust pipe of the hybrid electric vehicle is lower than a first temperature threshold, sending a first work instruction to the high-and-low-voltage-conversion module.

When the hybrid electric vehicle is powered on, the temperature of the exhaust pipe is first detected to determine whether the temperature of the exhaust pipe meets the temperature required for the normal operation of the catalyst.

S20: the high-and-low-voltage-conversion module outputting a first working voltage to turn on the electric heating of the catalyst according to the first working instruction.

When the temperature of the exhaust pipe is not satisfied, it enters the first working voltage mode to start the electric heating function of the catalyst.

S30: obtaining working data of hybrid electric vehicle.

Monitor the current situation of the vehicle through the work data of the vehicle. For example, the timing of the electric heating of the vehicle and the further detection of the temperature of the exhaust pipe.

S40: when the work data meets a switching condition, sending a second work instruction to the high-and-low-voltage-conversion module.

Determine whether the current working data meets the switching conditions of the working voltage mode.

S50: the high-and-low-voltage-conversion module outputting a second working voltage and stopping outputting the first working voltage according to the second working instruction to stop the electric heating.

When the current working data meets the switching condition, the switch enters the second working voltage mode.

In one embodiment, when the engine of the hybrid electric vehicle is cold-started or the engine is restarted after a long-term shutdown, that is, when the temperature of the exhaust pipe of the hybrid electric vehicle is lower than the first temperature threshold, the vehicle controller (that is, the processing module) send the first working instruction through CAN communication. When the high-and-low-voltage-conversion module receives the instruction, it immediately starts the corresponding first working voltage mode to electrically heat the catalyst. After heating for a period of time or the electric heating temperature reaches the working temperature of the catalyst for efficient conversion, the electric heating of the catalyst is completed. The vehicle controller needs to stop supplying power to the electric heater module. After that, during the engine operation, the exhaust pipe temperature is generally not lower than the first temperature threshold. Therefore, the vehicle controller sends the second work instruction according to the vehicle demand, and the high-and-low-voltage-conversion module turns off the first work voltage according to the second work instruction, to stop the corresponding first work voltage mode, and stops the electric heating of the catalyst, at this time, it switches to the second working voltage mode. The two working modes directly thus realize digital command control.

In this embodiment, the application can not only meet the electric heating demand by switching between the two working modes, but also has the advantages of small size, low cost, convenient industrial mass production application, high practical value and good economic benefits.

In this embodiment, in order to meet the power requirements for the electric heating of the catalyst, the engine will charge the power battery module in time according to the hybrid operation strategy during the operation of the hybrid electric vehicle, and the power battery module group will always maintain sufficient power to provide sufficient output. power. Before entering the first voltage mode to electrically heat the catalyst, it is first to detect whether the power of the power battery module is sufficient. In the case of insufficient power, the power battery module needs to be charged first. The source of charging can be an external power source, or the engine can be used for power generation and charging.

Figure 2:
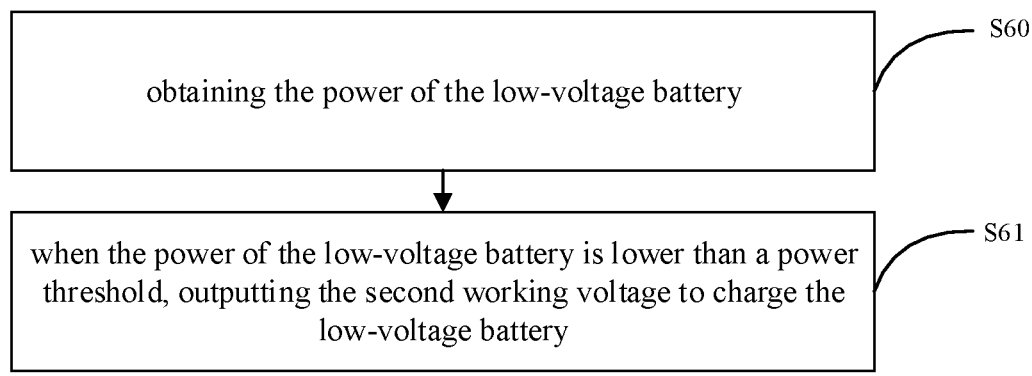
FIG. 2 is a flow chart of a three-way catalytic converter preheating control method according to another embodiment of the application.

FIG. 2 is a flow chart of a three-way catalytic converter preheating control method according to another embodiment of the application.

As shown in FIG. 2, in an embodiment, the three-way catalytic converter preheating control method before performing the steps S10: when the temperature of the exhaust pipe of the hybrid electric vehicle is lower than the first temperature threshold, sending the first work instruction to the high-and-low-voltage-conversion module includes:

S60: obtaining the power of the low-voltage battery;

S61: when the power of the low-voltage battery is lower than a power threshold, outputting the second working voltage to charge the low-voltage battery.

In this embodiment, since the low-voltage battery is the operating power supply for the entire vehicle system, including meters and sensors, before entering the first voltage mode to electrically heat the catalyst, first check whether the low-voltage battery has enough power. In the case of, it is necessary to use the power battery to charge the low-voltage battery through the high-low-voltage conversion module.

In one embodiment, the three-way catalytic converter preheating control method starts the hybrid electric vehicle engine after performing the step of S50: the high-low voltage conversion module outputting the second working voltage and stops outputting the first working voltage according to the second working instruction.

After the electrical heating of the catalyst is completed, the temperature of the exhaust pipe has reached the first temperature threshold, which meets the needs of the catalyst for normal operation. The engine can be started normally.

In an embodiment, the operating data of the hybrid electric vehicle includes the output duration of the first operating voltage. The switching condition of the three-way catalytic converter preheating control method is that output duration of the first operating voltage reaches the first time threshold.

Through experiments and calculations, for example, the 48V voltage has been able to make the temperature of the exhaust pipe reach the temperature at which the catalyst is fully working under the condition of working for 1-2 minutes (for example, 1.5 minutes). Therefore, when the heating time of the electric catalyst heating module reaches the first time threshold being preset, the vehicle controller switches the working mode according to the demand of the vehicle.

In another embodiment, the operating data of the hybrid electric vehicle includes exhaust pipe temperature. The switching condition of the three-way catalytic converter preheating control method is that the exhaust pipe temperature is not lower than the second temperature threshold. Wherein, the first temperature threshold may be equal to the second temperature threshold.

In this embodiment, the current temperature of the exhaust pipe is directly monitored to determine whether the heating is over. The electric heating temperature reaches the working temperature of the catalyst for efficient conversion, and the vehicle controller switches the working mode according to the needs of the vehicle.

Figure 3:
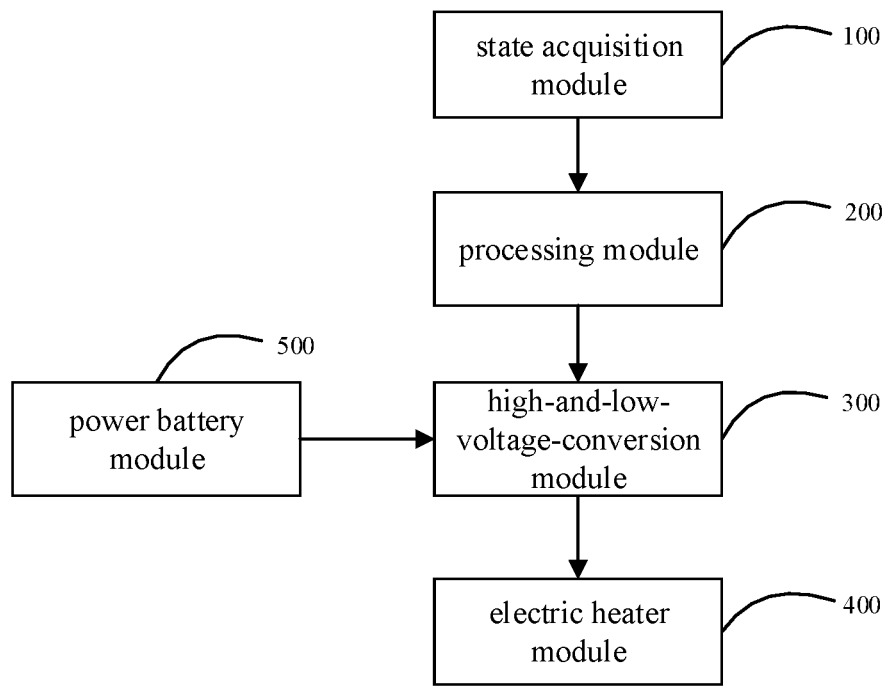
FIG. 3 is a block diagram of a three-way catalytic converter preheating control system according to another embodiment of the application.

On the other hand, the present application also provides a three-way catalytic converter preheating control system applied to a hybrid electric vehicle. FIG. 3 is a block diagram of a three-way catalytic converter preheating control system according to an embodiment of the present application.

Please refer to FIG. 3, in an embodiment, the three-way catalytic converter preheating control system includes a state acquisition module 100, a processing module 200, a high-and-low-voltage-conversion module 300, an electric heater module 400, and a power battery module 500, where the state acquisition module 100, the processing module 200, the high-and-low-voltage-conversion module 300, and the electric heater module 400 are connected in sequence, and the power battery module 500 is connected to the high-and-low-voltage-conversion module 300.

Among them, the state acquisition module 100 is configured to acquire and send the exhaust pipe temperature of the hybrid electric vehicle and the working data of the hybrid electric vehicle to the processing module 200. The processing module 200 is configured to send a first work instruction to the high-and-low-voltage-conversion module 300 when the exhaust pipe temperature of the hybrid electric vehicle is lower than the first temperature threshold, and send a second work instruction to the high-and-low-voltage-conversion module when the work data meets the switching conditions 300.

The high-and-low-voltage-conversion module 300 outputs the first working voltage according to the first working instruction to enable the electric heater module 400 to electrically heat the catalyst; according to the second working instruction, it outputs the second working voltage and stops outputting the first working voltage to make the electric heater module 400 stopping electric heating.

In one embodiment, when the engine of the hybrid electric vehicle is cold-started or the engine is restarted after a long-term shutdown, the state acquisition module 100 acquires and sends the working data that the temperature of the exhaust pipe of the hybrid electric vehicle is lower than the first temperature threshold to the processing module 200, the processing module 200 sends the first working instruction through CAN communication. When the high-low voltage conversion module 300 receives the instruction, it immediately starts the corresponding first working voltage mode, and the electric heater module 400 electrically heats the catalyst. After a period of time or when the electric heating temperature reaches the working temperature for efficient conversion of the catalyst, the electric heating of the catalyst is completed. After the engine is running, the temperature of the exhaust pipe is generally not lower than the first temperature threshold, so it is necessary to stop power supply to the electric heater module 400. At this time, the processing module 200 sends the second work instruction according to the vehicle demand, the high-and-low-voltage-conversion module turns off the first work voltage according to the second work instruction to stop the corresponding first work voltage mode, and stops the electric heating of the catalyst. At this time, it switches to the second working voltage mode. The two working modes therefore realize digital command control.

In this embodiment, in order to meet the power requirement for electric heating, the engine charges the power battery module 500 in time during the operation of the hybrid vehicle, and the power battery module 500 will always maintain sufficient power to provide sufficient output power. Before entering the first voltage mode to electrically heat the catalyst, the processing module 200 determines whether to charge the power battery according to the power-off state sent by the power battery. The source of charging can be an external power source, or the engine can be used for power generation and charging.

In an embodiment, the processing module 200 of the three-way catalytic converter preheating control system is also used to start the engine of the hybrid vehicle.

In this embodiment, after the electrical heating of the catalyst is completed, the temperature of the exhaust pipe has reached the first temperature threshold, which meets the requirements of the catalyst for normal operation. The engine can be started normally. During engine operation thereafter, the exhaust pipe temperature is generally not lower than the first temperature threshold.

In one embodiment, the first working voltage of the three-way catalytic converter preheating control system of the electric heating control system of the hybrid electric vehicle is 48V, and the second working voltage is 12V.

In this embodiment, there are currently two types of catalyst electric heaters, 12V/2 kW and 48V/4 kW, on the market. The 48V/4 kWEHC electric heater has been found to work well and can meet the future National VII emission requirements; 48V/4KW electric heaters have been tested. The heater's working voltage is 48V, and the DC-DC of hybrid cars currently on the market generally only output 12V.

In one embodiment, the first working voltage 48V and the second working voltage 12V in the high-and-low-voltage-conversion module 300 share the main circuit, control circuit and heat dissipation system of the high-and-low-voltage-conversion module, which effectively releases the space for ornaments, reduces the product volume, and greatly reduces The cost of the product facilitates the implementation of industrialized mass production applications.

In an embodiment, the first working voltage 48V output by the high-and-low-voltage-conversion module 300 can be a transformer-transformed rectifier circuit, or a bootstrap boost or a voltage doubling circuit, and a transformer can be shared with the second working voltage 12V.

In an embodiment, the operating data of the hybrid electric vehicle includes the output duration of the first operating voltage. The switching condition of the three-way catalytic converter preheating control system is that the first operating voltage output duration reaches the first time threshold.

Through experiments and calculations, 48V has been able to make the temperature of the exhaust pipe reach the temperature at which the catalyst is fully working under the condition of working for 1-2 minutes (for example, 1.5 minutes). Therefore, when the heating time of the electric catalyst heating module reaches the first time threshold being preset, the vehicle controller switches the working mode according to the demand of the vehicle.

In another embodiment, the operating data of the hybrid electric vehicle includes exhaust pipe temperature. The switching condition of the three-way catalytic converter preheating control system is that the exhaust pipe temperature is not lower than the second temperature threshold.

In this embodiment, the current temperature of the exhaust pipe is directly monitored to determine whether the heating is over. When the electric heating temperature of the catalyst electric heater module 400 reaches the working temperature for efficient conversion of the catalyst, the vehicle controller switches the working mode according to the demand of the vehicle. Wherein, the first temperature threshold may be equal to the second temperature threshold.

Figure 4:
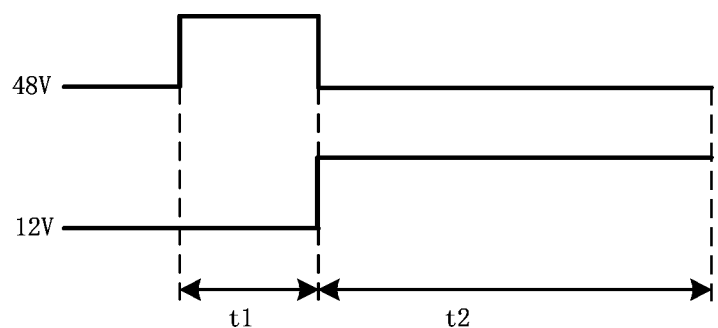
FIG. 4 is a working sequence diagram of a three-way catalytic converter preheating control system according to an embodiment of the application.

FIG. 4 is a working sequence diagram of a three-way catalytic converter preheating control system according to an embodiment of the application.

As shown in FIG. 4, in one embodiment, when the car wakes up, the three-way catalytic converter preheating control system first provides a working voltage of 48V to enter the first working voltage mode, which corresponds to the t1 period in the figure. After reaching the first time threshold of 1-2 minutes, the three-way catalytic converter preheating control system turns off the 48V working voltage, outputs the second working voltage of 12V, and enters the second working voltage mode, which corresponds to the t2 period in the figure.

In the t2 period, the temperature of the exhaust pipe has reached the high-efficiency operating temperature of the catalyst and the engine is started.

On the other hand, the present application also provides a vehicle. Specifically, the vehicle includes a vehicle body and the three-way catalytic converter preheating control system as described above. When the vehicle uses the three-way catalytic converter preheating control system, the technical principles involved are the same as those in the above embodiments, and will not be repeated here.

In one embodiment, the working principle and characteristics of the three-way catalytic converter preheating of the vehicle are as follows:

(1) The power battery module can use a high-voltage, high-power lithium-ion battery pack, which can meet the 4 kW/2 minutes power demand required for the electric heating of the catalyst. During the operation of the hybrid vehicle, the engine will charge the power battery module in time, and the power battery will always be maintained. Sufficient power to provide sufficient output power.

(2) The 48V/4 kW power supply can be integrated into a 12V DC-DC, where the main loop of the high-and-low voltage converter, control circuit, and heat dissipation system are shared with the 12V DC-DC.

(3) Since 48V/4 kW needs to be used for 1 to 2 minutes before the engine starts, not only the frequency of use is less, but the working time is also shorter. The power devices and heat dissipation system of the original 12V DC-DC main circuit can meet the requirements of 48V/4 kW by appropriate adjustments. 1~2 minutes EHC electric heating power demand.

(4) In the high-and-low voltage-conversion circuit that integrates 12V and 48V, the two voltage output terminals of 12V and 48V are respectively equipped with power electronic switches for switching control of different working voltage modes. The electronic switch can be set at the positive or negative end of each output of 12V and 48V.

(5) The three-way catalytic converter preheating control system has two working modes: 48V working mode and 12V working mode. The switching of the two working modes is digitally controlled by the communication command sent by the vehicle controller through the CAN bus.

(6) 48V and 12V adopt a time-sharing working mechanism: when the engine is cold-started or the engine is restarted after a long period of shutdown, the vehicle controller sends a 48V work instruction through CAN communication. When the 48V&12V high-and-low-voltage-conversion module receives the instruction, it starts 48V working mode immediately, the catalyst electric heating receives 48V DC power supply. After heating for 1 to 2 minutes, when the electric heater temperature reaches the working temperature of the catalyst for efficient conversion, the vehicle controller will issue a 48V work instruction to shut down, and the 48V power supply will immediately stop heating the electric. The power supply of the generator is completed, and the electric heating of the catalyst is completed, and then the vehicle controller switches to the 12V working mode according to the demand of the vehicle.

(7) The vehicle controller can make comprehensive judgments based on the temperature of the engine exhaust pipe, the power of the power battery, the voltage of the 12V low-voltage battery, and the working conditions of the vehicle's low-voltage load, and then switch the 48V/12V operating mode.

On the other hand, the present application also provides a storage medium. Specifically, a computer program is stored on the storage medium. When the computer program is executed by a computer, it can realize the above-mentioned three-way catalytic converter preheating control method. When the computer program realizes the preheating control method of the three-way catalytic converter, the technical principles involved are the same as those in the above embodiments, and will not be repeated here.

The three-way catalytic converter preheating control method, system, vehicle, and storage medium provided in this application can provide two working modes through digital control instructions, which can use the power battery to pre-heat the catalyst in the three-way catalytic converter through the high-and-low-voltage-conversion module when the temperature of the exhaust pipe is low.

The above are only the preferred embodiments of this application, and do not limit the scope of this application. Any equivalent structure or equivalent process transformation made using the content of the description and drawings of this application, or directly or indirectly used in other related technical fields, the same reason is included in the scope of patent protection of this application.

What is claimed is:

1. A three-way catalytic converter preheating control method, characterized in that, it is applied to a hybrid vehicle and comprises:
   when the temperature of an exhaust pipe of the hybrid electric vehicle is lower than a first temperature threshold, sending a first work instruction to a high-and-low-voltage-conversion module;
   the high-and-low-voltage-conversion module outputting a first working voltage to turn on the electric heating of the catalyst according to the first working instruction;
   obtaining working data of the hybrid electric vehicle;
   when the working data meets a switching condition, sending a second working instruction to the high-and-low-voltage-conversion module;
   the high-and-low-voltage-conversion module outputting a second working voltage and stopping outputting the first working voltage according to the second working instruction to stop the electric heating;
   starting an engine of the hybrid electric vehicle according to the second operating voltage;
   wherein the switching condition is that the output duration of the first working voltage reaches a first-time threshold; or, the temperature of an exhaust pipe is not lower than the first temperature threshold;
   wherein the first working voltage is 48V, and the second working voltage is 12V.

2. The three-way catalytic converter preheating control method according to claim 1, characterized in that, before the step of when the temperature of an exhaust pipe of the hybrid electric vehicle is lower than the first temperature threshold, sending the first work instruction to the high-and-low-voltage-conversion module, the method comprises:
   obtaining the power of the high-voltage power battery in the hybrid electric vehicle.

3. The three-way catalytic converter preheating control method according to claim 1, characterized in that, before the step of when the temperature of an exhaust pipe of the hybrid electric vehicle is lower than the first temperature threshold, sending the first work instruction to the high-and-low-voltage-conversion module, the method comprises:
obtaining the power of a low-voltage battery;
when the power of the low-voltage battery is lower than the power threshold, outputting the second working voltage to charge the low-voltage battery.

4. A three-way catalytic converter preheating control system applied to a hybrid electric vehicle, characterized in that, comprising a state acquisition module, a processing module, a high-and-low-voltage-conversion module, an electric heater module, and a power battery module, wherein the state acquisition module , the processing module, the high-and-low-voltage-conversion module and the electric heater module are connected in sequence, the power battery module connected to the high-and-low-voltage-conversion module:
the state acquisition module is configured to acquire and send the temperature of an exhaust pipe of the hybrid electric vehicle and the working data of the hybrid electric vehicle to the processing module; the processing module is configured to send a first work instruction to the high-and-low-voltage-conversion module when the temperature of the exhaust pipe of the hybrid electric vehicle is lower than a first temperature threshold, and when the work data meets a switching condition, send a second work instruction to the high-and-low-voltage-conversion module;
the high-and-low-voltage-conversion module outputs a first working voltage according to the first working instruction to enable the electric heater module to turn on electric heating of the catalyst; according to the second working instruction, outputs a second working voltage to start an engine of the hybrid electric vehicle according to the second operating voltage and stops outputting the first working voltage enables the electric heater module to stop the electric heating;
the power battery module provides a high-voltage power supply for the high-low-voltage conversion module;
wherein the switching condition is that the output duration of the first working voltage reaches a first-time threshold; or, the temperature of an exhaust pipe is not lower than the first temperature threshold;
wherein the first working voltage is 48V, and the second working voltage is 12V.

5. The three-way catalytic converter preheating control system according to claim 4, characterized in that, the processing module is also configured to start an engine of the hybrid vehicle.

6. The three-way catalytic converter preheating control system according to claim 4, characterized in that, the high-and-low-voltage-conversion module comprises a high-and-low voltage-conversion circuit, and the voltage conversion circuit is configured to convert the high-voltage-power-battery voltage into the first working voltage and the second working voltage.

7. The three-way catalytic converter preheating control system according to claim 4, characterized in that, the high-and-low-voltage-conversion circuit comprises a high-and-low-voltage-conversion-switch circuit, a high frequency transformer, a 12V output circuit, a 48V output circuit, a 12V-output-and-48V-output-switching circuit.

8. The three-way catalytic converter preheating control system according to claim 4, characterized in that, the switching condition is that the output duration of the first working voltage reaches a first-time threshold; or, the temperature of an exhaust pipe is not lower than the first temperature threshold.

9. A vehicle, characterized in that, the vehicle comprises a vehicle body and the three-way catalytic converter preheating control system according to claim 4.

10. A storage medium, characterized in that, a computer program is stored on the storage medium, and when the computer program is executed by a computer, the three-way catalytic converter preheating control method according to claim 1 can be realized.

* * * * *